(12) United States Patent
Korenaga

(10) Patent No.: US 8,870,383 B2
(45) Date of Patent: Oct. 28, 2014

(54) INCOHERENCE DEVICE AND OPTICAL APPARATUS USING SAME

(75) Inventor: Tsuguhiro Korenaga, Osaka (JP)

(73) Assignee: Panasonic Corporation, Osaka (JP)

( * ) Notice: Subject to any disclaimer, the term of this patent is extended or adjusted under 35 U.S.C. 154(b) by 197 days.

(21) Appl. No.: 13/699,798

(22) PCT Filed: Apr. 2, 2012

(86) PCT No.: PCT/JP2012/002293
§ 371 (c)(1),
(2), (4) Date: Nov. 26, 2012

(87) PCT Pub. No.: WO2012/140845
PCT Pub. Date: Oct. 18, 2012

(65) Prior Publication Data
US 2013/0070207 A1 Mar. 21, 2013

(30) Foreign Application Priority Data
Apr. 12, 2011 (JP) ................... 2011-088505

(51) Int. Cl.
| | |
|---|---|
| *G03B 21/00* | (2006.01) |
| *G02B 27/48* | (2006.01) |
| *G02B 17/02* | (2006.01) |
| *G02B 17/00* | (2006.01) |
| *G03B 21/20* | (2006.01) |

(52) U.S. Cl.
CPC ............ *G02B 27/48* (2013.01); *G02B 21/2033* (2013.01); *G02B 17/023* (2013.01); *G02B 17/004* (2013.01); *G03B 21/208* (2013.01)
USPC .................. 353/31; 353/30; 353/32; 353/34; 353/84; 353/98; 359/242; 359/569; 359/572; 348/739; 348/740; 348/774

(58) Field of Classification Search
USPC ........ 353/20, 30–34, 38, 81, 84, 98; 348/739, 348/740, 743, 744, 774; 349/5, 7–9, 349/112–113; 359/241, 242, 289, 569, 572, 359/584, 590
See application file for complete search history.

(56) References Cited

U.S. PATENT DOCUMENTS 6,464,361 B2 * 10/2002 Togino et al. ................... 353/98
6,728,034 B1    4/2004 Nakanishi et al.
(Continued)

FOREIGN PATENT DOCUMENTS

CN    1940610 A    4/2007
JP    61-248001 A   11/1986
(Continued)

OTHER PUBLICATIONS

International Search Report for corresponding International Application No. PCT/JP2012/002293 mailed May 22, 2012.
(Continued)

*Primary Examiner* — Sultan Chowdhury
(74) *Attorney, Agent, or Firm* — Renner, Otto, Boisselle & Sklar, LLP

(57) ABSTRACT

An optical member includes: a total reflection mirror including a reflection surface for reflecting a laser beam; a filter including a partially transmissive surface for passing therethrough a part of the laser beam and reflecting the remaining part of the laser beam, the partially transmissive surface being located so as to be opposed to the reflection surface ; and a diffraction grating into which the laser beam enters, for diffracting the incident laser beam to enter the total reflection mirror or the partially transmissive filter.

13 Claims, 12 Drawing Sheets

(56) References Cited

U.S. PATENT DOCUMENTS

| | | | |
|---|---|---|---|
| 7,845,799 B2 * | 12/2010 | Kubara et al. | 353/7 |
| 2003/0123159 A1 | 7/2003 | Morita et al. | |
| 2004/0233534 A1 | 11/2004 | Nakanishi et al. | |
| 2007/0070504 A1 | 3/2007 | Akutsu et al. | |
| 2009/0257106 A1 | 10/2009 | Tan et al. | |
| 2010/0026919 A1 | 2/2010 | Yamauchi et al. | |
| 2010/0226014 A1 * | 9/2010 | Taira et al. | 359/571 |
| 2010/0328550 A1 * | 12/2010 | Wang | 348/744 |
| 2011/0102898 A1 | 5/2011 | Korenaga et al. | |
| 2013/0057832 A1 * | 3/2013 | Akiyama | 353/20 |

FOREIGN PATENT DOCUMENTS

| | | | |
|---|---|---|---|
| JP | 63-211624 A | 9/1988 | |
| JP | 63-216338 A | 9/1988 | |
| JP | 01-290276 A | 11/1989 | |
| JP | 01-292821 A | 11/1989 | |
| JP | 06-167640 A | 6/1994 | |
| JP | 09-061610 A | 3/1997 | |
| JP | 2001-059905 A | 3/2001 | |
| JP | 2002-267825 A | 9/2002 | |
| JP | 2006-267284 A | 10/2006 | |
| JP | 2008-152019 A | 7/2008 | |
| JP | 2009-258738 A | 11/2009 | |
| JP | 2010-258737 A | 2/2010 | |
| JP | 4630393 B | 11/2010 | |

OTHER PUBLICATIONS

Form PCT/ISA/237 for corresponding International Application No. PCT/JP2012/002293 mailed May 22, 2012 and Partial English Translation.

Chinese Search Report for corresponding Chinese Application No. 201280001448.4 mailed May 28, 2014 (English Translation).

* cited by examiner (a)

(b)

INCOHERENCE DEVICE AND OPTICAL APPARATUS USING SAME

TECHNICAL FIELD

The present invention relates to an optical member (device for obtaining incoherent light) and an optical apparatus using the same.

BACKGROUND ART

Optical apparatus such as a projector and a display which use light sources of three wavelengths of R, G, and B that are primary colors are becoming widespread and penetrating. As a light source, generally, a light-emitting diode (LED) is mainly used, but, when used for projecting or displaying an image and a video, a brighter image is strongly required, and thus, a laser (LD) is becoming more popular than an LED.

Compared with an LED, a laser has features of higher light intensity, a narrower wavelength width, and higher coherence. Therefore, although a bright image may be obtained, when a laser is used as a light source of a projector, for example, there is a problem that, due to interference of light scattered by minute unevenness on a screen or the like, noise called speckles appears on the projected image, which tends to degrade the image quality.

Several proposals have been made to reduce these speckles.

One proposal utilizes the principle that the human eye does not sense speckles when a laser beam is temporally varied at high speed.

For example, Patent Document No. 1 proposes a method of reducing speckles by using a diffractive lens element in which a large number of recesses having different depths are formed on a transparent base material for an illumination apparatus and rotating the diffractive lens element. Further, Patent Document No. 2 discloses a despeckle device which uses a system in which an optical retarder providing an odd integer multiple of half-wave retardation is mechanically rotated and vibrated or liquid crystal is actuated.

On the other hand, as means for reducing speckles which does not use such mechanical or electrical actuation, there is a method in which an optical-path difference larger than a coherence length of a laser light source is given in a laser beam.

For example, Patent Document No. 3 discloses a method in which an optical fiber bundle having an optical-path difference is provided in an optical path of a laser beam.

Further, Patent Document Nos. 4 and 5 disclose methods which enable miniaturization by using a passive component. FIG. 12 illustrates an optical apparatus disclosed in Patent Document No. 4. A laser light flux entering from an incident window 121 of a plane parallel plate 120 at a predetermined angle is refracted and is reflected by a first reflection surface 122, and then, is reflected by a second reflection surface 123. Reflection is repeated alternately at these first and second reflection surfaces 122 and 123. Transmission windows (not shown) are partly provided in the first reflection surface 122. By setting an optical-path difference between laser light fluxes passing through these transmission windows to be larger than a coherence length of a laser light source, light fluxes which pass through adjacent transmission windows are made incoherent from each other.

Further, FIG. 13 illustrates an optical system of an illumination apparatus disclosed in Patent Document No. 5. In FIG. 13, a beam splitter 130 includes a parallel plate in which a reflection film is bonded to both surfaces of a quartz plate, and reflectivities of reflection surfaces a, b, c, d, and e are 75%, 66.5%, 50%, 0%, and 100%, respectively. When a laser beam enters the beam splitter 130, four beams having substantially the same intensity are output. An optical-path difference between the respective beams is set to be larger than a coherence length, and thus, the four beams are incoherent from one another. Further, each beam is split into two beams polarized to be perpendicular to each other by a birefringent crystal 131 located at the back. Beams which are polarized to be perpendicular to each other do not interfere with each other, and thus, the eight beams in total do not interfere with one another, that is, the eight beams in total are incoherent from one another.

Further, Patent Document No. 6 discloses a method of reducing speckles by diffusing light with the use of a diffractive optical element so that the diffusion angle of the light becomes larger than that before the incidence in a spatial modulation device for modulating light entering from a light source.

CITATION LIST

Patent Literature

Patent Document No. 1: Japanese Patent Application Laid-Open Publication No. 2002-267825
Patent Document No. 2: Japanese Patent Application Laid-Open Publication No. 2009-258738
Patent Document No. 3: Japanese Patent Application Laid-Open Publication No. 6-167640
Patent Document No. 4: Japanese Patent Application Laid-Open Publication No. 1-292821
Patent Document No. 5: Japanese Patent Application Laid-Open Publication No. 1-290276
Patent Document No. 6: Japanese Patent Application Laid-Open Publication No. 2010-39137

SUMMARY OF INVENTION

Technical Problem

It is a principal object of the present invention to provide a small optical member which does not have a mechanical or electrical actuating portion and which may control light intensity distribution of an exiting beam (device for obtaining incoherent light) and an optical apparatus using the same.

Solution to Problem

An optical member according to an embodiment of the present invention includes: a total reflection mirror including a reflection surface for reflecting a laser beam; a filter including a partially transmissive surface for passing therethrough a part of the laser beam and reflecting the remaining part of the laser beam, the partially transmissive surface being located so as to be opposed to the reflection surface; and a diffraction grating into which the laser beam enters, for diffracting the incident laser beam to enter the total reflection mirror or the partially transmissive filter.

Advantageous Effects of Invention

According to the present invention, by adjusting the spacing between gratings in the diffraction grating and the value of the ratio between the transmittance and the reflectivity of the partially transmissive filter, the size of a beam exiting from the optical member and light intensity distribution of the beam can be freely designed.

Further, the optical member can be located perpendicularly to incident light. Further, light exiting from the optical member can be distributed so as to be symmetrical with respect to the central axis of light entering the optical member. Therefore, miniaturization is possible.

DESCRIPTION OF EMBODIMENTS

Figure 1A:
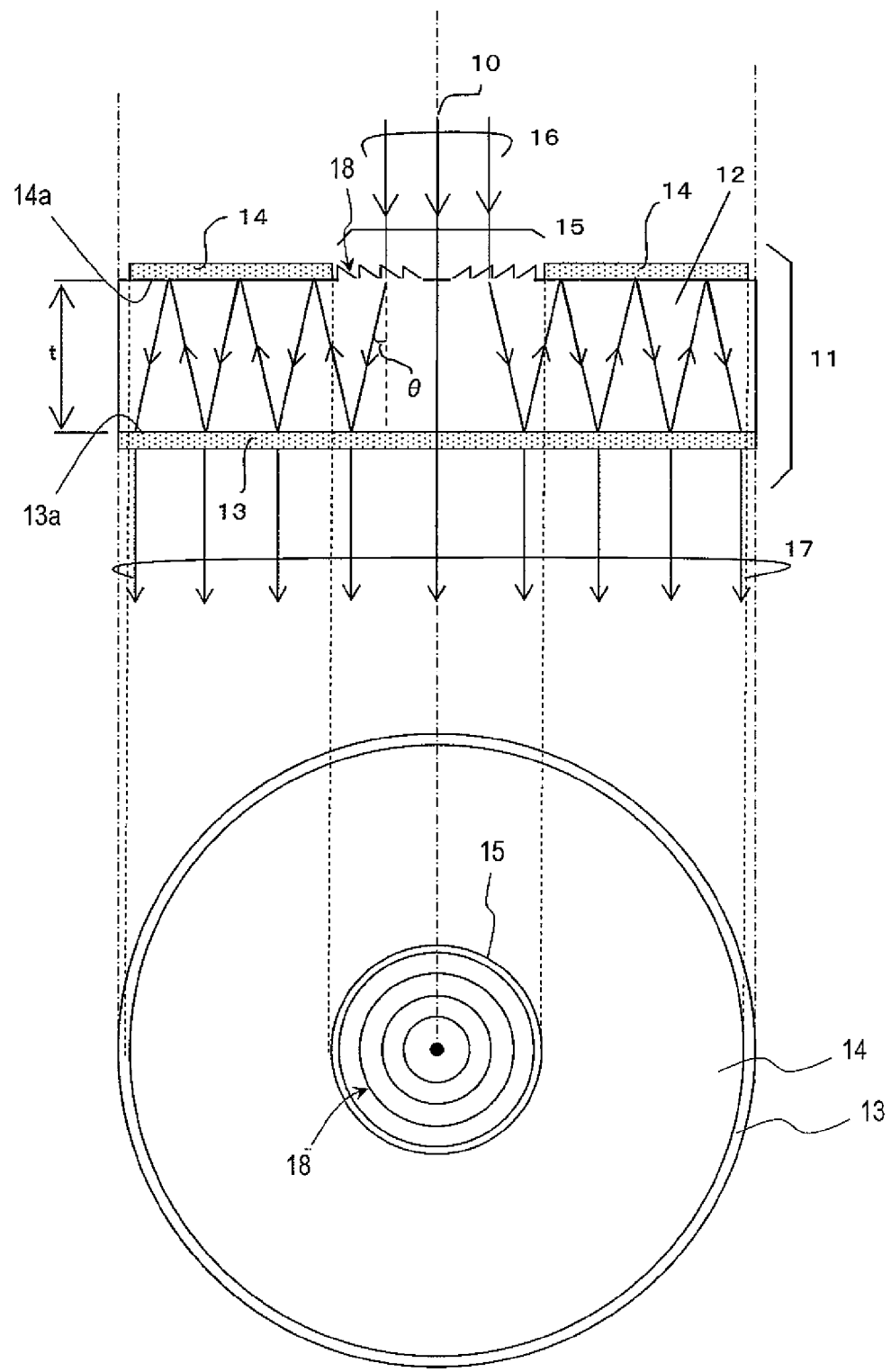
FIG. 1A is a sectional view and a plan view illustrating a device 11 for obtaining incoherent light of a first embodiment.

An optical member according to an embodiment of the present invention includes: a total reflection mirror including a reflection surface for reflecting a laser beam; a filter including a partially transmissive surface for passing therethrough a part of the laser beam and reflecting the remaining part of the laser beam, the partially transmissive surface being located so as to be opposed to the reflection surface; and a diffraction grating into which the laser beam enters, for diffracting the incident laser beam to enter the total reflection mirror or the partially transmissive filter.

The optical member may further include a transparent member provided between the total reflection mirror and the partially transmissive filter, and the diffraction grating may be provided on a surface of the transparent member.

The optical member may further include a protective film for covering a surface of the diffraction grating.

Any one of a material of the diffraction grating and a material of the protective film may have a refractive index higher than a refractive index of another one of the materials and have an Abbe number larger than an Abbe number of the another one of the materials.

The diffraction grating and the protective film may include a resin, and the resin included in at least any one of the diffraction grating and the protective film may have inorganic particles dispersed therein.

The protective film may include a material in which particles of at least any one of zirconium oxide, yttrium oxide, and aluminum oxide are dispersed in a photo-curable resin.

A cross section of the laser beam exiting from the optical member may have a shape which is isotropic with respect to a center of the cross section.

When a cross section of the laser beam has a major axis and a minor axis, the diffraction grating may diffract the laser beam so that a ratio of a length of the minor axis to the major axis in the laser beam exiting from the optical member is larger than a ratio of the length of the minor axis to the major axis in the laser beam entering the diffraction grating.

The diffraction grating may include a plurality of subregions for diffracting the laser beam in different directions.

When the diffraction grating includes a plurality of diffraction steps, the plurality of diffraction steps may have oval flat surface shapes which are concentric, and spacing between adjacent two of the plurality of diffraction steps may be smaller in a minor axis direction of the oval than in a major axis direction of the oval.

The total reflection mirror may have an opening for causing the laser beam to enter the diffraction grating, and the laser beam may enter the opening so as to be perpendicular to the opening.

When the laser beam diffracted by the diffraction grating enters the total reflection mirror, the laser beam may be reflected by the total reflection mirror to enter the partially transmissive filter, and, when the laser beam diffracted by the diffraction grating enters the partially transmissive filter, a part of the laser beam may pass through the partially transmissive filter and the remaining part of the laser beam may be reflected by the partially transmissive filter to enter the total reflection mirror.

A cross section of the laser beam exiting from the optical member may be larger than a cross section of the laser beam entering the optical member.

An optical apparatus according to an embodiment of the present invention includes: a laser light source; a spatial light modulation element for modulating a laser beam exiting from the laser light source; a projection optical system for projecting light modulated by the spatial light modulation element as an image; and the optical member according to the embodiment of the present invention, the optical member being located between the laser light source and the spatial light modulation element.

The laser light source may include a red wavelength laser light source, a green wavelength laser light source, and a blue wavelength laser light source.

Review by the inventor of the present has revealed that the methods disclosed in Patent Document Nos. 1 to 6 have the following problems.

In the disclosures of Patent Document Nos. 1 and 2, it is necessary to mechanically or electrically actuate a lens element or the like. Specifically, a complicated mechanism, power supply, or the like is necessary. Therefore, it is not preferred to apply the invention disclosed in Patent Document No. 1 or 2 to an apparatus for which miniaturization and portability are sought. Further, the coherence of an incident laser beam is not reduced, and thus, the inventions are not effective at reducing the light gathering ability of a laser. For example, in a retina scanning display which gathers light from RGB lasers on human retina to display a color image, it is necessary to prevent damage to the retina by means for reducing the intensity of the lasers and for reducing the light gathering ability of the lasers. To reduce the coherence of a laser, that is, to obtain an incoherent laser is one of effective means for reducing the light gathering ability, but, in the disclosures of Patent Document Nos. 1 and 2, the laser is not made incoherent, and thus, the inventions are not suitable for such a purpose.

In the disclosure of Patent Document No. 3, the space for an optical fiber bundle needs to be secured, which is not suitable for miniaturization. Further, loss of light occurs when light enters the optical fiber, which lowers the light intensity.

Further, in Patent Document Nos. 4 and 5, an incident light beam is refracted. In both Patent Document No. 4 and Patent Document No. 5, there are only several exiting light beams to be split. In Patent Document Nos. 4 and 5, it is difficult to increase the number of the light beams, and these methods lack extensibility and general versatility. Further, it is not easy to obtain symmetrical intensity distribution of exiting light beams. Further, it is necessary to slant the plane parallel plate in Patent Document No. 4 and the beam splitter in Patent Document No. 5 with respect to a laser beam, which upsizes the optical system and requires alignment of components.

Further, in the method disclosed in Patent Document No. 6, diffusion at the diffractive optical element is used, and thus, there are a plurality of orders of diffraction and there is diffracted light of orders which are not used. Thus, the efficiency of using a light beam is low and loss occurs.

Embodiments which may solve these problems are described in the following.

(First Embodiment)

FIG. 1A is a sectional view and a plan view illustrating a device for obtaining incoherent light according to a first embodiment of the present invention. A device 11 for obtaining incoherent light of this embodiment includes a total reflection mirror 14, a partially transmissive filter 13 opposed to the reflection surface, and a diffraction grating 18 provided in an incident window 15 in the total reflection mirror 14. A transparent substrate 12 having a thickness t is provided between the total reflection mirror 14 and the partially transmissive filter 13.

Each of the total reflection mirror 14, the partially transmissive filter 13, and the incident window 15 has a circular flat surface shape. The incident window 15 is located so that the center thereof is coincident with a central axis 10 of a laser beam 16. The diffraction grating is provided on a part of a surface of the transparent substrate 12 which is exposed by the incident window 15.

Figure 1B:
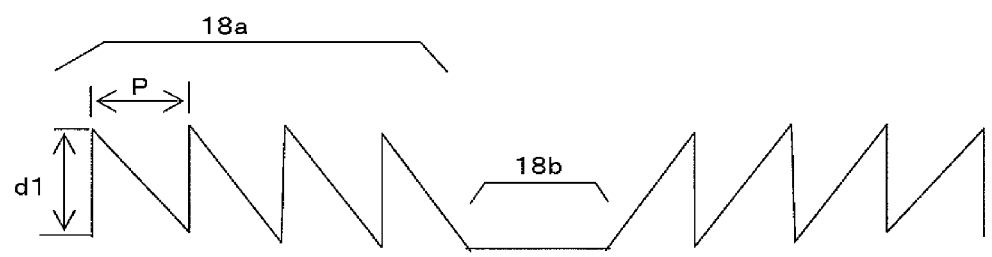
FIG. 1B is an enlarged sectional view of an incident window 15 in the first embodiment.

FIG. 1B is an enlarged sectional view of the inside of the incident window 15. The diffraction grating 18 located inside the incident window 15 has a concentric blazed diffraction step portion 18a with the central axis 10 of the incident window 15 being the center thereof and a flat portion 18b located in the center of the incident window 15. Each step in the blazed diffraction step portion 18a has a depth d1, and spacing between adjacent steps, that is, pitch, is P.

The step-to-step pitch P in the blazed diffraction step portion 18a may be constant or may be variable. By changing the step-to-step pitch P, the intensity distribution in a diverging beam 17 in cross section may be changed.

The laser beam 16 exiting from a light source such as a projector enters the incident window 15 so as to be perpendicular thereto (for example, so as to form an angle of 5 degrees or less with a vertical direction with respect to the incident window) to reach the diffraction grating 18 in the incident window 15. Light which enters the flat portion 18b of the diffraction grating 18 travels in a straight line. On the other hand, light which enters the blazed diffraction step portion 18a is diffracted to travel away from the central axis 10 of the incident window 15 (in a direction which is slanted outward from the direction of the straight line by an angle θ) to reach the partially transmissive filter 13. A part of the light passes through the partially transmissive filter 13 and is taken to the outside, while another part of the light is reflected by the partially transmissive filter 13 to enter a total reflection surface 14a of the total reflection mirror 14. Light entering the total reflection surface 14a is reflected toward the partially transmissive filter 13. In this way, light entering the device 11 for obtaining incoherent light reciprocates inside by being reflected by the partially transmissive filter 13 and the total reflection mirror 14. In the course of that process, a part of light which reaches the partially transmissive filter 13 passes therethrough in sequence, and the diverging beam 17 is emitted from a surface on a side opposite to the incident window 15 in the device 11 for obtaining incoherent light. The diffraction grating 18 of this embodiment diffracts light entering the blaze-like diffraction step portion 18a to the side, and thus, the diverging beam 17 has a beam diameter (and a cross-sectional area) which is larger than the beam diameter (and the cross sectional area) of the incident laser beam 16. However, the beam diameter of the diverging beam 17 is not necessarily required to be larger than the beam diameter of the incident laser beam 16. Further, in this embodiment, a cross section of the laser beam 16 exiting from the device 11 for obtaining incoherent light has a shape which is isotropic with respect to the center of the cross section (circular).

The angle θ formed when light is diffracted by the blazed diffraction step portion 18a is generally referred to as a diffraction angle, and the following relationship holds:

$$\sin\theta = m\cdot\lambda/P \qquad \text{[Math. 1]}$$

where m is the order of diffraction and λ is the wavelength of the incident laser beam 16.

A depth d of diffraction steps when the diffraction efficiency of diffracted light having the m-th order of diffraction is theoretically 100% is expressed by the following equation:

$$d = m\cdot\lambda/|n1-n2| \qquad \text{[Math. 2]}$$

where n1 is the refractive index of the blazed diffraction step portion 18a and n2 is the refractive index of a medium in contact with the blazed diffraction grating. In this embodiment, the blazed diffraction step portion 18a is in contact with air, and thus, the value of n2 is 1.

The blazed diffraction step portion 18a is formed integrally with the transparent base material 12. The blazed diffraction step portion 18a may be formed by a semiconductor process such as etching or a publicly-known process such as molding using a mold. The blazed diffraction step portion 18a and the transparent base material 12 are not necessarily required to be formed of the same material, and may be formed of different materials. Further, as the material of the transparent base material 12 or the diffraction grating 18, various kinds of optical glasses or various kinds of optical resins may be adopted.

As illustrated in FIG. 1A, the diffracted beam is repeatedly reflected alternately by the partially transmissive filter 13 and the total reflection mirror 14, and a part of the diffracted beam passes through the partially transmissive filter 13. An optical-path difference Δ between adjacent transmitted beams is expressed by the following equation:

$$\Delta = 2t(1-\cos\theta)/\cos\theta \quad \text{[Math. 3]}$$

By determining the order of diffraction m, the diffraction angle θ, and the thickness t of the transparent base material 12 so that this value is larger than the coherence length of the incident laser beam 16, an incoherent exiting beam 17 is output. Specifically, from the relationship expressed by (Math. 2), the order m of diffracted light diffracted with efficiency when the depth of the diffraction steps in FIG. 1A is d1 is determined, and, from the relationships expressed by (Math. 1) and (Math. 3), the optical-path difference Δ is determined.

As described above, according to the device for obtaining incoherent light of this embodiment, by adjusting the parameters of the depth d1 of the diffraction steps, the pitch P of the diffraction grating, and the thickness t of the transparent base material, the optical-path difference between adjacent beams may be arbitrarily set.

With regard to the optical elements disclosed in Patent Document Nos. 4 and 5, the intensity of the beam becomes lower as the number of reflections becomes larger, and thus, it is difficult to secure the symmetry of the intensity distribution of the exiting beam. Further, it is necessary to locate the optical element so as to be diagonal with respect to the laser beam, which requires a certain distance in the direction of the optical axis, and thus, miniaturization of the optical system is difficult.

On the other hand, the device for obtaining incoherent light of this embodiment may obtain the intensity distribution of the exiting beam 17 symmetrical with respect to the central axis 10. Further, the device may be located so as to be perpendicular to the incident laser beam 26, which is advantageous in miniaturizing the optical system.

Further, by setting the value of the ratio between the transmittance and the reflectivity of the partially transmissive filter 13 and the spacing between steps (gratings) of the diffraction grating, the intensity distribution of the exiting beam and the size of the beam may be arbitrarily designed. Further, a general lens optical system is axisymmetric, and thus, a beam having intensity distribution which is symmetrical with respect to the optical axis may be emitted without using a special optical system, which is advantageous in simplifying the optical system.

The partially transmissive filter 13 is formed of, for example, a multilayer film including two or more kinds of dielectric materials. For example, a multilayer film formed by alternately stacking titanium oxide and silicon oxide may be used. By appropriately selecting the structure and the material of the film of the partially transmissive filter 13, the ratios of the transmittance and the reflectivity may be arbitrarily assigned irrespective of the direction of polarization of the beam. Further, absorption of light by the partially transmissive filter 13 may be reduced.

As described above, according to this embodiment, by using the diffraction grating, even a small device may control with ease the light intensity distribution of an exiting beam.

Note that, the total reflection mirror 14 and the incident window 15 of this embodiment are provided on a flat surface of the transparent base material 12, and the partially transmissive filter 13 is provided on a flat surface opposed thereto, but, by providing the total reflection mirror 14 and the incident window 15 on curved surfaces, the action of a lens may be added.

(Second Embodiment)

FIG. 2(a) is a sectional view illustrating a device for obtaining incoherent light according to a second embodiment of the present invention. A device 21 for obtaining incoherent light of this embodiment is different from the device 11 for obtaining incoherent light of the first embodiment in that a protective film 29 is provided on a surface of a diffraction grating 28 in an incident window 25. Other structural members are in common. In the following, detailed description of the common structures is omitted.

FIG. 2(b) is an enlarged sectional view of the incident window 25. The diffraction grating 28 located inside the incident window 25 has a concentric blazed diffraction step portion 28a with a central axis 20 of the incident window 25 being the center thereof and a flat portion 28b located in the center of the incident window 25. Each step in the blazed diffraction step portion 28a has a depth d2, and spacing between adjacent steps, that is, a pitch, is P. The protective film 29 is provided on surfaces of the blazed diffraction step portion 28a and the flat portion 28b in the diffraction grating 28. Note that, in FIGS. 2(a) and 2(b), the protective film 29 is provided on the entire surface of the diffraction grating 18, but the protective film 29 may be provided only partially.

A laser beam 26 exiting from a light source such as a projector enters the incident window 25 so as to be substantially perpendicular thereto along the central axis 20. A cross section of the laser beam 26 is, for example, circular. A portion of the laser beam 26 in proximity to the central axis 20 travels in a straight line along the central axis 20, but beams on the periphery thereof are diffracted by a concentric diffraction grating to travel away from the central axis 20 (in a direction which is slanted outward from the direction of the straight line by the angle θ). Each diffracted beam is repeatedly reflected alternately by a partially transmissive filter 23 and a total reflection mirror 24, and a part of the diffracted beam passes through a surface on a side opposite to the incident window 25. The diffraction grating 28 of this embodiment diffracts light entering the blaze-like diffraction step portion 28a to the outer side, and thus, a diverging beam 27 has a beam diameter which is larger than the beam diameter of the incident laser beam 126.

By appropriately combining the refractive indices of the blazed diffraction step portion b and the protective film 29 and their wavelength dispersibilities, the dependence of the diffraction efficiency on the wavelength may be eliminated.

The depth d of the diffraction steps when the diffraction efficiency of diffracted light having the m-th order of diffraction is theoretically 100% is expressed by the above-mentioned (Math. 2).

Figure 3:
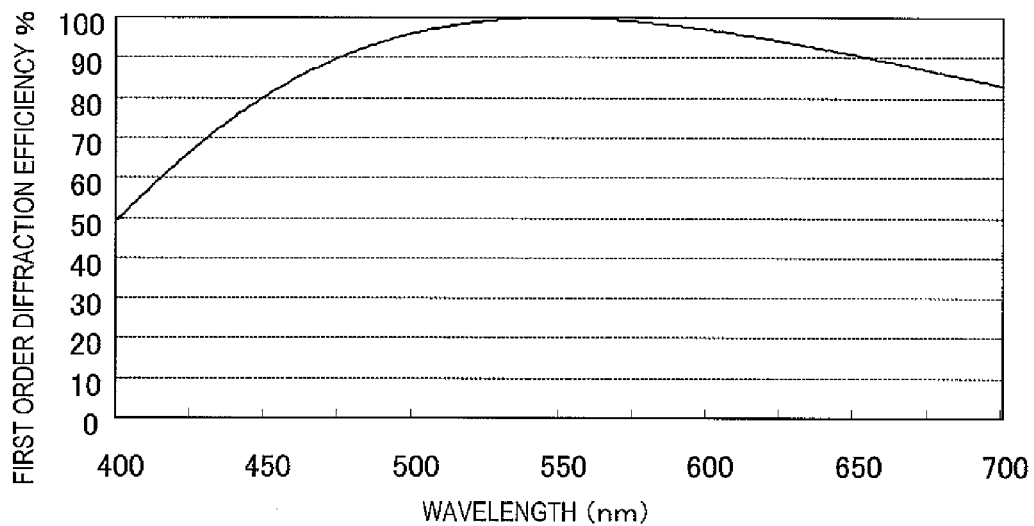
FIG. 3 is a graph showing the result of calculation in simulation of the dependence of first order diffraction efficiency on wavelength when a diffraction grating is in contact with air.

The diffraction efficiency when the blazed diffraction grating is in contact with air as in the first embodiment is as shown in FIG. 3. FIG. 3 is a graph showing the result of calculation in simulation of the dependence of first order diffraction efficiency on the wavelength. The depth of the diffraction steps of the diffraction grating set in this calculation is 0.86 μm. As shown in FIG. 3, the first order diffraction efficiency exhibits a high value in a particular wavelength (in FIG. 3, when the wavelength is about 550 nm), but is lowered on a shorter wavelength side and on a longer wavelength side. The portion of the lowered first order diffraction efficiency corresponds to diffracted light of other orders of diffraction such as zero order and second order.

In this embodiment, by providing the protective film 29, lowering of the first order diffraction efficiency in dependence on the wavelength of the laser beam may be inhibited. Specifically, diffraction steps having the depth d are provided so that the right side of (Math. 2) is constant irrespective of the wavelength λ of the laser beam and satisfies (Math. 2).

In order to reduce the dependence of the diffraction efficiency on the wavelength, it is preferred that any one of the material of the diffraction grating 28 and the material of the protective film 29 have a refractive index which is higher than that of the other material and have a wavelength dispersibility which is lower than that of the other material (a larger Abbe number). By such properties, d with which the first order diffraction efficiency becomes the highest becomes constant irrespective of the wavelength used. Exemplary combinations of such materials include a combination of a glass and a resin and a combination of a nanocomposite material in which fine particles of an inorganic material are uniformly dispersed in a resin material and a resin. Specifically, when a low refractive index and high wavelength dispersibility material is used as the diffraction grating 28 (that is, a transparent substrate 22) and a high refractive index and low wavelength dispersibility material is used as the protective film 29, polycarbonate (having a d-line refractive index of 1.585 and an Abbe number of 27.9) may be used as the diffraction grating 28 and a nanocomposite resin in which zirconium oxide having a particle diameter of 10 nm or less is dispersed in an acrylic UV curable resin (having a d-line refractive index of 1.623 and an Abbe number of 40) may be used as the protective film 29.

Other than zirconium oxide, any one of yttrium oxide and aluminum oxide or a mixture thereof may be used.

If all of the transparent base material 22, the diffraction grating 28, and the protective film 29 are formed of a resin, the productivity is high and the weight may be reduced easily.

Figure 4:
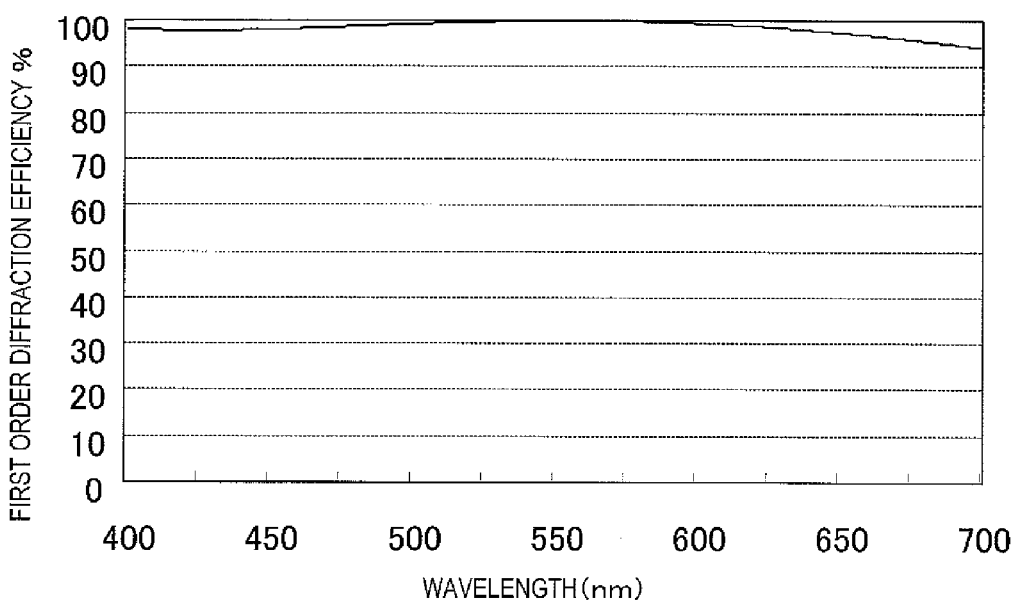
FIG. 4 is a graph showing the result of calculation in simulation of the dependence of first order diffraction efficiency on wavelength when the diffraction grating is in contact with a protective film.

FIG. 4 is a graph showing the dependence of the first order diffraction efficiency on the wavelength when the blazed diffraction grating and the protective film are formed of polycarbonate and a nanocomposite resin, respectively. The depth d2 of the diffraction steps set in this calculation is 14.9 μm.

As shown in FIG. 4, with regard to the device 21 for obtaining incoherent light of this embodiment, a high first order diffraction efficiency of 95% or more is exhibited in the entire visible wavelength region. Similarly, when the depth of the diffraction steps is doubled to be 29.8 μm, the diffraction efficiency of second order diffracted light may become uniformly high in the entire visible wavelength region, and, when the depth of the diffraction steps is tripled to be 44.7 μm, the diffraction efficiency of third order diffracted light may become uniformly high in the entire visible wavelength region.

According to this embodiment, by providing the protective film 29, the light use efficiency in three wavelength bands of R, G, and B, that is, the so-called entire visible wavelength region, may be enhanced.

The diffraction grating 28 is formed integrally with the transparent base material 22. The diffraction grating 28 may be formed by a semiconductor process such as etching or a publicly-known process such as molding using a mold. The diffraction grating 28 and the transparent base material 22 are not necessarily required to be formed of the same material, and may be formed of different materials.

The device for obtaining incoherent light of this embodiment may obtain the intensity distribution of the exiting beam 27 symmetrical with respect to the central axis 10. Further, the device may be located so as to be perpendicular to the incident laser beam 26, which is advantageous in miniaturizing the optical system.

By setting the value of the ratio between the transmittance and the reflectivity of the partially transmissive filter 23 and the spacing between steps (gratings) of the diffraction grating, the intensity distribution of the exiting beam and the size of the beam may be controlled. A general lens optical system is axisymmetric, and thus, a beam having intensity distribution which is symmetrical with respect to the optical axis may be emitted without using a special optical system, which is advantageous in simplifying the optical system.

In particular, the device for obtaining incoherent light of this embodiment has high diffraction efficiency in the entire visible wavelength region irrespective of the wavelength, and thus, high diffraction efficiency may be obtained by one structure with regard to all the three wavelengths of R, G, and B of the incident laser beam 26. The laser beam 26 having the wavelengths of R, G, and B may be formed by being synthesized from laser beams having the wavelengths of R, G, and B by the optical system.

Note that, the total reflection mirror 24 and the incident window 25 of this embodiment are provided on a flat surface of the transparent base material 22, and the partially transmissive filter 23 is provided on a flat surface opposed thereto, but, by providing the total reflection mirror 24 and the incident window 25 on curved surfaces, the action of a lens may be added.

(Third Embodiment)

Figure 5:
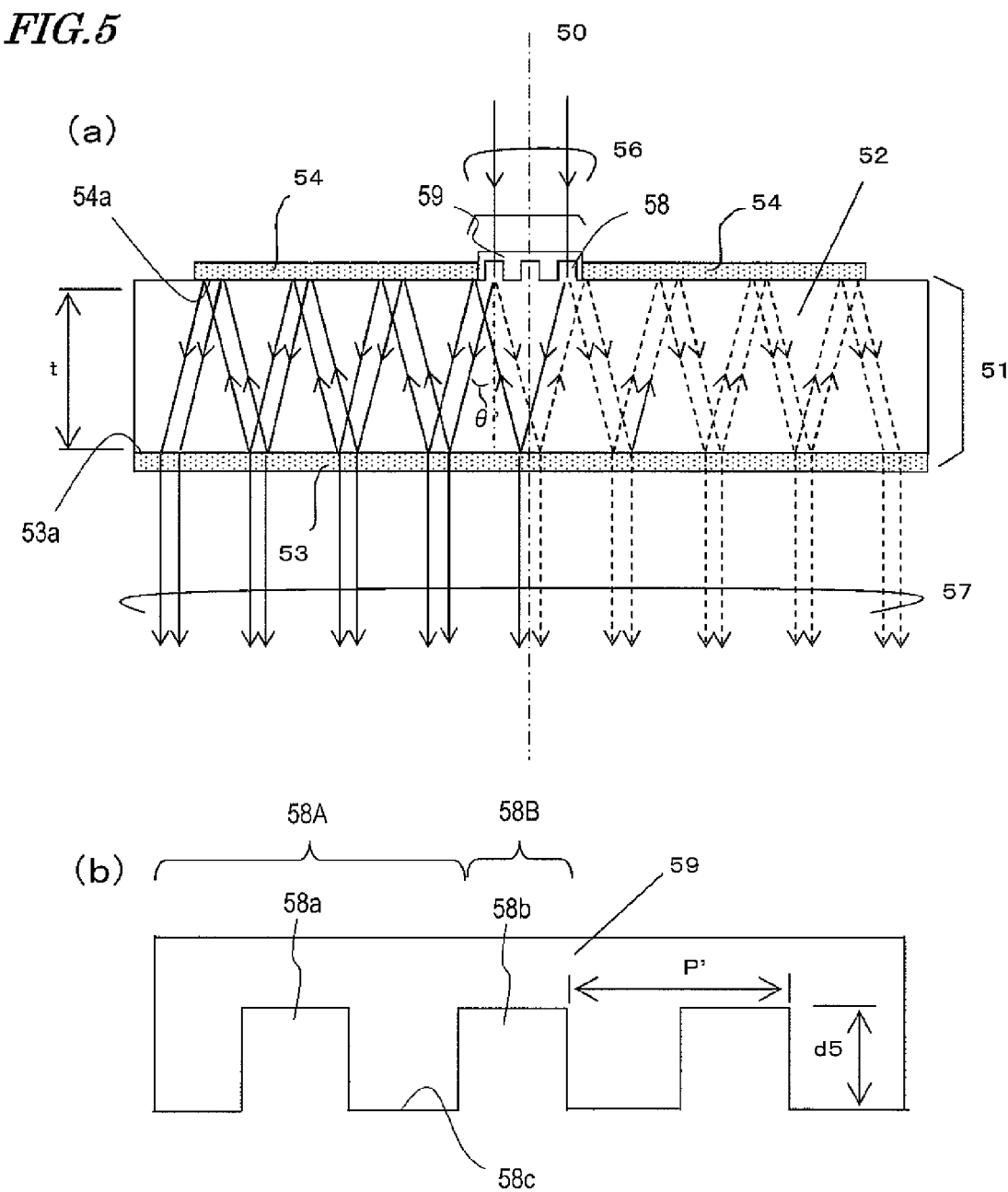
FIG. 5(a) is a sectional view illustrating a device 51 for obtaining incoherent light of a third embodiment.
FIG. 5(b) is an enlarged sectional view of an incident window 55 in the third embodiment.

FIG. 5(*a*) is a sectional view illustrating a device for obtaining incoherent light according to a third embodiment of the present invention. A device 51 for obtaining incoherent light of this embodiment is different from the device 21 for obtaining incoherent light of the second embodiment only in the shape of a diffraction grating 58 in an incident window 55. Other structural members are in common. In the following, detailed description of the common structures is omitted.

FIG. 5(*b*) is an enlarged sectional view of the incident window 55. The diffraction grating 58 located inside the incident window 55 has a flat portion 58B located in the center of the incident window 55 and a concentric binary diffraction step portion 58A with a central axis 50 of the incident window 55 being the center thereof. The flat portion 58B is an upper surface of a protrusion 58*b* located in the center of the incident window 55, and the shape of the flat surface is circular. The binary diffraction step portion 58A includes a protrusion 58*a* in the shape of a ring-like flat surface with the central axis 50 of the incident window 55 being the center, and a recess 58*c* between the two protrusions 58*a* and 58*b*. For the sake of easy viewing, the diffraction grating 58 illustrated in FIGS. 5(*a*) and 5(*b*) includes only one ring-like protrusion 58*a*, but a plurality of the ring-like protrusions 58*a* may be provided.

Similarly to the case of the second embodiment, any one of the material of the diffraction grating 58 and the material of a protective film 59 has a refractive index which is higher than that of the other material and has a wavelength dispersibility which is lower than that of the other material. By such properties, the depth of the diffraction steps with which a particular order diffraction efficiency becomes the highest becomes constant irrespective of the wavelength used.

The difference between the blazed diffraction grating 28 of the second embodiment and the binary diffraction grating 58 of this embodiment is described in the following.

Figure 2:
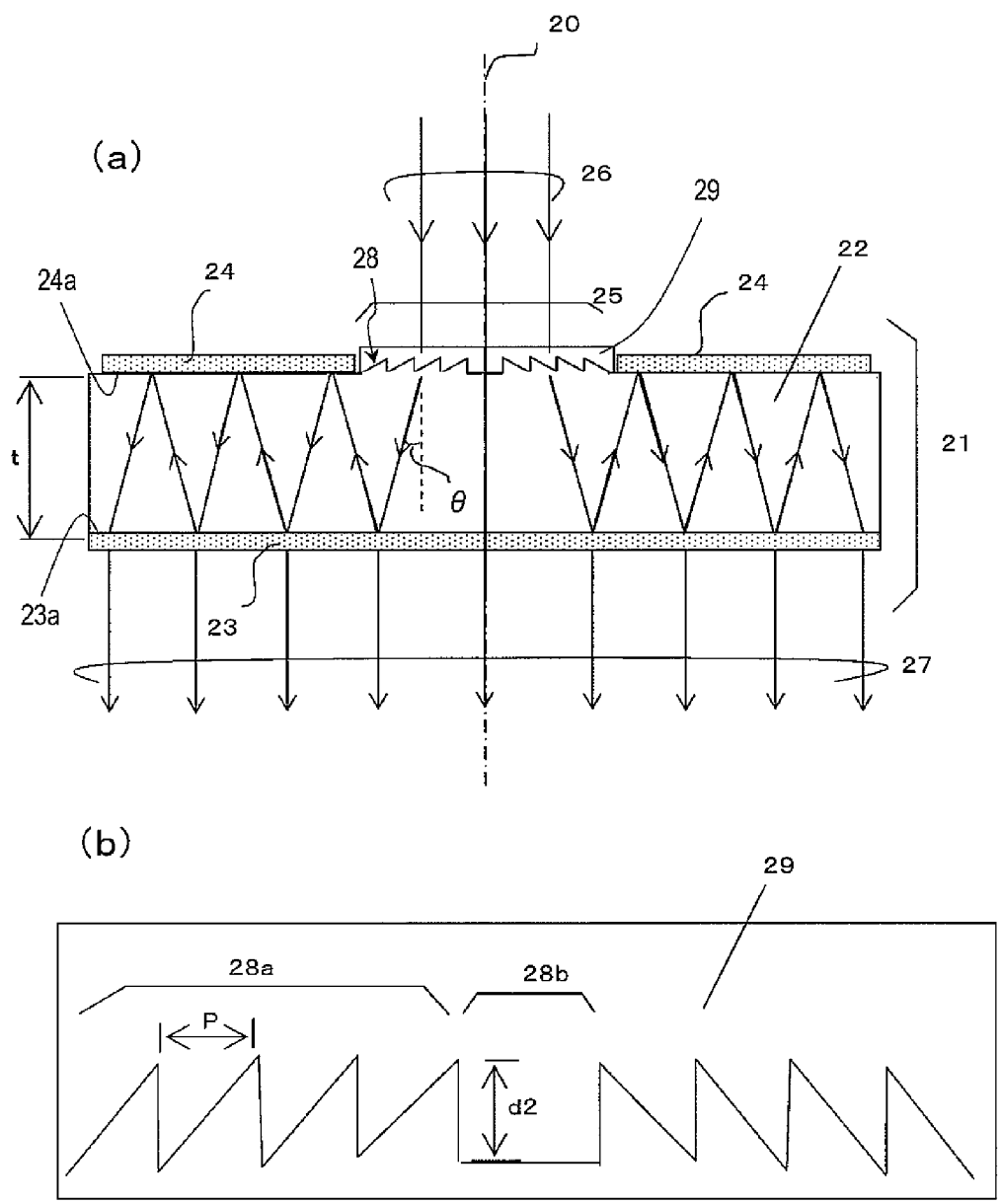
FIG. 2(a) is a sectional view illustrating a device 21 for obtaining incoherent light of a second embodiment.
FIG. 2(b) is an enlarged sectional view of an incident window 25 in the second embodiment.

The blazed diffraction grating 28 illustrated in FIG. 2(*b*) is sawtooth in cross section, and, when the depth d of the diffraction steps satisfies (Math. 2), the m-th order diffraction efficiency is theoretically 100%. In particular, in the second embodiment, materials of the blazed diffraction grating and the protective film are selected so that the value of $\lambda/|n1-n2|$ is substantially constant irrespective of the wavelength $\lambda$.

On the other hand, the diffraction grating 58 of this embodiment illustrated in FIG. 5(b) is a binary diffraction grating which is in the shape of a square wave in cross section. In this case, a depth d5 of the diffraction steps multiplied by two is substituted for d in (Math. 2). When (Math. 2) is satisfied, the first order diffraction efficiency and the minus first order diffraction efficiency are theoretically about 40%. The minus first order diffraction is light diffracted in a direction laterally opposite to the first order diffraction. In FIG. 5(a), diffracted light 56a in solid lines (diffracted light which is diffracted to the left in the figure so as to form a diffraction angle θ') is the first order diffracted light while diffracted light 56b in broken lines (diffracted light which is diffracted to the right in the figure so as to form the diffraction angle θ') is the minus first order diffracted light.

According to this embodiment, also, the first order diffraction efficiency and the minus first order diffraction efficiency in the entire visible wavelength region are constant irrespective of the wavelength. However, the protective film 59 is not necessarily required to be provided.

The device for obtaining incoherent light of this embodiment may obtain the intensity distribution of an exiting beam 57 symmetrical with respect to the central axis 50. Further, the device may be located so as to be perpendicular to an incident laser beam 56, which is advantageous in miniaturizing the optical system.

Further, by setting the value of the ratio between the transmittance and the reflectivity of a partially transmissive filter 53 and the spacing between steps (gratings) of the diffraction grating, the intensity distribution of the exiting beam and the size of the beam may be controlled. A general lens optical system is axisymmetric, and thus, a beam having intensity distribution which is symmetrical with respect to the optical axis may be emitted without using a special optical system, which is advantageous in simplifying the optical system.

In particular, the device for obtaining incoherent light of this embodiment has equivalent diffraction efficiency in the entire visible wavelength region irrespective of the wavelength, and, there is almost no light beam which is diffracted in orders other than the zero order to be lost, and thus, high diffraction efficiency may be obtained by one structure with regard to all the three wavelengths of R, G, and B of the incident laser beam 56. The laser beam 26 having the wavelengths of R, G, and B may be formed by being synthesized from laser beams having the wavelengths of R, G, and B by the optical system.

Note that, the total reflection mirror 54 and the incident window 55 of this embodiment are provided on a flat surface of a transparent base material 52, and the partially transmissive filter 53 is provided on a flat surface opposed thereto, but, by providing the total reflection mirror 54 and the incident window 55 on curved surfaces, the action of a lens may be added.

(Fourth Embodiment)

Figure 6:
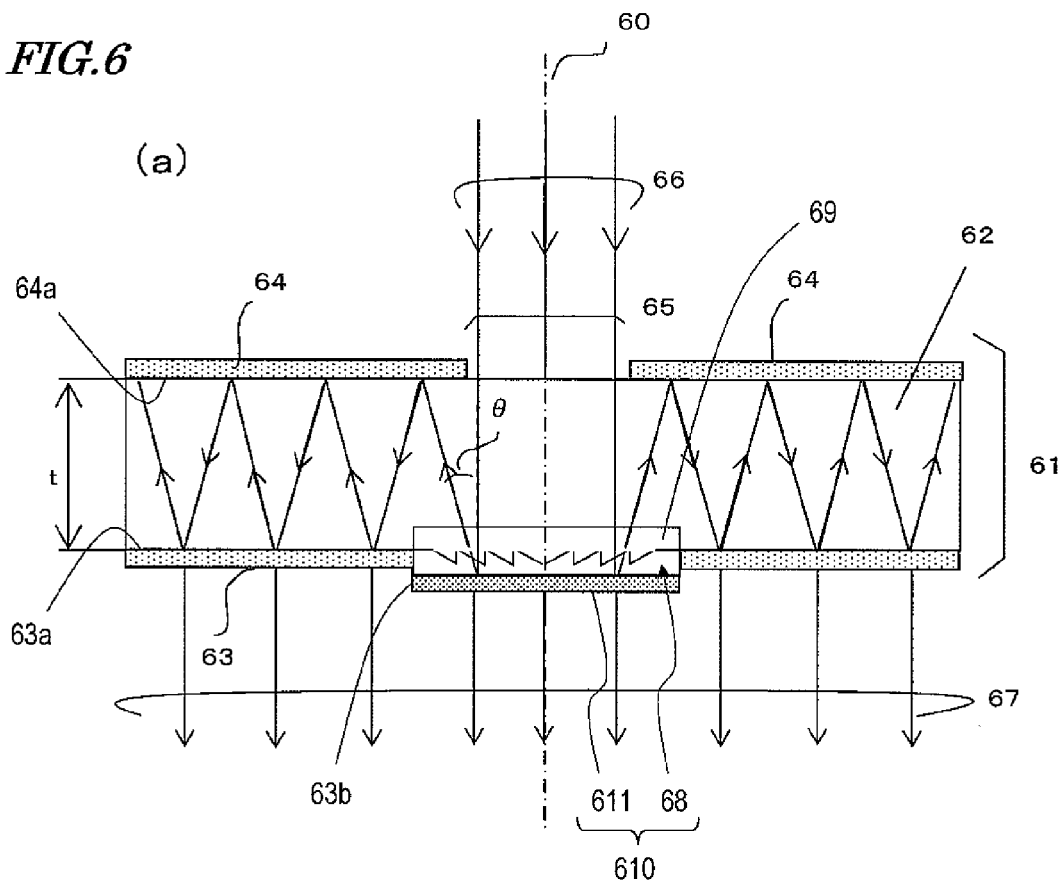
FIG. 6(a) is a sectional view illustrating a device 61 for obtaining incoherent light of a fourth embodiment.
FIG. 6(b) is an enlarged sectional view of a reflective diffracting portion 610 in the fourth embodiment.
Figure 6:
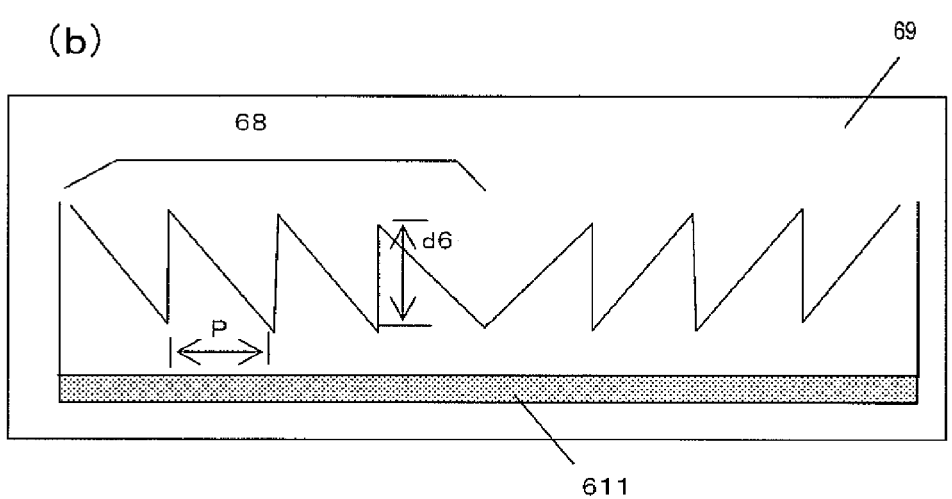

FIG. 6(a) is a sectional view illustrating a device for obtaining incoherent light according to a fourth embodiment of the present invention. A device 61 for obtaining incoherent light of this embodiment includes a total reflection mirror 64, an incident window 65 provided in the total reflection mirror 64, a reflective diffraction portion 610 provided at a location opposed to the incident window 65, and a first partially transmissive filter 63 provided so as to be opposed to the total reflection mirror 64 and so as to be adjacent to the reflective diffraction portion 610. The reflective diffraction portion 610 includes a concentric blazed diffraction step portion 68 and a second partially transmissive filter 611 in contact with a surface of the blazed diffraction step portion 68 which is opposite to a surface opposing to the incident window 65 (on a light emitting surface side of the device for obtaining incoherent light). The first partially transmissive filter 63 is provided so as to surround the circular reflective diffraction portion 610 in plan view.

In the first embodiment, the transmission diffraction grating 18 is provided on the light incident side, but, in this embodiment, the reflective diffraction portion 610 is provided on the light emission side. A transparent substrate 62 having the thickness t is provided between the total reflection mirror 64 and the partially transmissive filter 63. A central axis 60 of a laser beam 66 entering the device 61 for obtaining incoherent light is coincident with the center of the incident window 65 and the center of the reflective diffraction portion 610.

The laser beam 66 entering the incident window 65 so as to be perpendicular thereto along the central axis 60 is circular in cross section. The laser beam 66 travels in a straight line through a transparent base material 62 to reach the reflective diffraction portion 610.

FIG. 6(b) is an enlarged sectional view of the reflective diffraction portion 610. As described above, the reflective diffraction portion 610 includes the blazed diffraction step portion 68 and the second partially transmissive filter 611. Each step in the blazed diffraction step portion 68 has a depth d6, and spacing between adjacent steps, that is, a pitch, is P. A protective film 69 is provided on a surface of the reflective diffraction portion 610. However, the protective film 69 is not necessarily required to be provided.

The laser beam 66 which passes through the transparent base material 62 in this embodiment passes through the blazed diffraction step portion 68 to reach the second partially transmissive filter 611. A part of the laser beam 66 which reaches the second partially transmissive filter 611 passes through the second partially transmissive filter 611 and travels in a straight line to be emitted to. the outside of the device 61 for obtaining incoherent light. A part of the laser beam 66 which reaches the second partially transmissive filter 611 is reflected by the second partially transmissive filter 611 and passes through the blazed diffraction grating 68 again. Light which passes through the blazed diffraction grating 68 twice in this way is a diffracted beam and travels away from the central axis 10 of the incident window 15 (in a direction which is slanted outward from the direction of the straight line by the angle θ). The diffracted beam is repeatedly reflected alternately by the total reflection mirror 64 and the first partially transmissive filter 63, and a part of the diffracted beam passes through the first partially transmissive filter 63. The reflective diffraction portion 610 of this embodiment diffracts light entering the blazed diffraction step portion 68 to the outer side, and thus, a diverging beam 67 has a beam diameter which is larger than the beam diameter of the incident laser beam 66.

In this embodiment, the reflective diffraction portion 610 is used. In this case, a depth dr of diffraction steps when the diffraction efficiency of diffracted light having the m-th order of diffraction is theoretically 100% is expressed by the following equation:

$$dr = m \cdot \lambda/2|n1-n2| \qquad \text{[Math. 4]}$$

where n1 is the refractive index of the blazed diffraction grating and n2 is the refractive index of a medium in contact with the blazed diffraction grating.

Specifically, diffracted light having the same order of diffraction may be formed with diffraction steps half the depth of the case of the second embodiment.

Any one of the material of the blazed diffraction grating 68 and the material of the protective film 69 has a refractive index which is higher than that of the other material and has a wavelength dispersibility which is lower than that of the other material. By such properties, the depth of the diffraction steps with which a particular order diffraction efficiency becomes the highest becomes constant irrespective of the wavelength used. Detailed description of structures in this embodiment which are similar to those in the first or second embodiment is omitted.

The device for obtaining incoherent light of this embodiment may obtain the intensity distribution of an exiting beam 67 symmetrical with respect to the central axis 60. Further, the device may be located so as to be perpendicular to the incident laser beam 66, which is advantageous in miniaturizing the optical system.

By setting the values of the ratios between the transmittance and the reflectivity of the first partially transmissive filter 63 and between the transmittance and the reflectivity of the second partially transmissive filter 610 and the spacing between steps (gratings) of the diffraction grating, the intensity distribution of the exiting beam and the size of the beam may be controlled. A general lens optical system is axisymmetric, and thus, a beam having intensity distribution which is symmetrical with respect to the optical axis may be emitted without using a special optical system, which is advantageous in simplifying the optical system.

In particular, the device for obtaining incoherent light of this embodiment has high diffraction efficiency in the entire visible wavelength region irrespective of the wavelength, and thus, high diffraction efficiency may be obtained by one structure with regard to all the three wavelengths of R, G, and B of the incident laser beam 66. The laser beam 66 having the wavelengths of R, G, and B may be formed by being synthesized from laser beams having the wavelengths of R, G, and B by the optical system.

Note that, in this embodiment, the total reflection mirror 64 and the incident window 65 are provided on a flat surface of the transparent base material 62, and the reflective diffraction portion 610 and the first partially transmissive filter 63 are provided on a flat surface opposed thereto, but, by providing the total reflection mirror 64 and the incident window 65 on curved surfaces, the action of a lens may be added.

(Fifth Embodiment)

In the first to fourth embodiments, a beam which is circular in cross section is handled. In the following, a device for obtaining incoherent light is described which handles an incident laser beam in which the shape in cross section and the intensity distribution are not axisymmetric.

Figure 7:
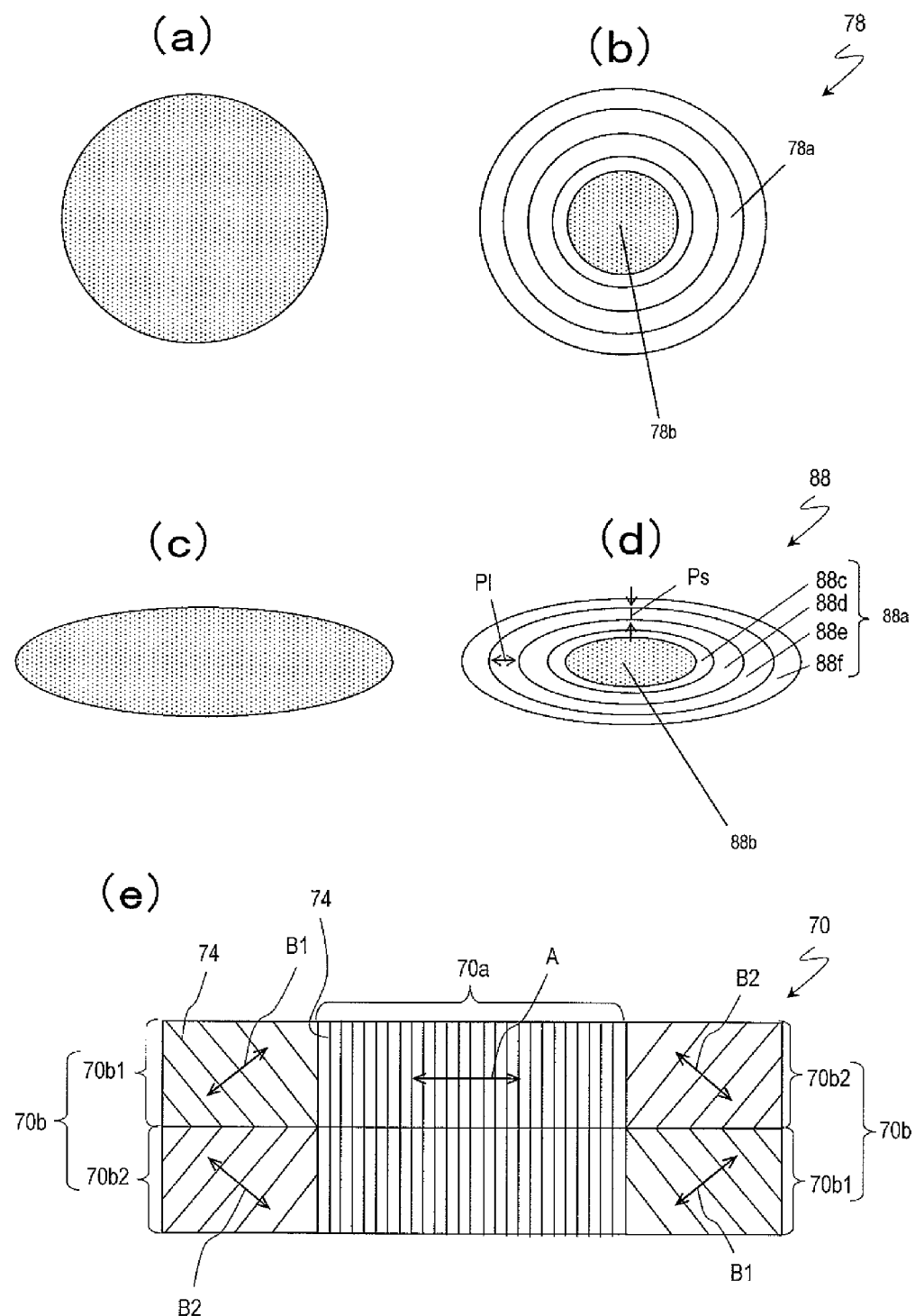
FIGS. 7(a) to 7(e) are sectional views of incident laser beams and a front view illustrating the shape of a diffraction grating in embodiments of the present invention.

FIG. 7(a) illustrates an incident laser beam which is circular in cross section. With regard to such an incident laser beam, by using the diffraction grating used in the first to fourth embodiments, that is, a concentric diffraction grating 78 as illustrated in FIG. 7(b), an exiting beam which is circular in cross section may be emitted.

However, a semiconductor laser widely used as a laser light source has a thin film-like active layer, and thus, a beam exiting from an end face thereof reflects the shape of the active layer and spreads greatly in a direction perpendicular to the direction of the thickness of the active layer. Specifically, a beam exiting from an end face of the active layer is oval in the far field section as illustrated in FIG. 7(c). In order to convert such an oval beam into a beam which is circular in cross section as illustrated in FIG. 7(a), an optical system for shaping a beam is necessary, which inevitably increases the number of components and increases the size of the optical system. In this embodiment, a diffraction grating 88 having an oval flat surface shape as illustrated in FIG. 7(d) is used with regard to a beam which is oval in cross section. The diffraction grating 88 illustrated in FIG. 7(d) includes a flat portion 88b located at the center of the diffraction grating 88 and a diffraction step portion 88a located outside the flat portion 88b. The diffraction step portion 88a has a plurality of ring bands (regions between two adjacent diffraction steps) 88c, 88d, 88e, and 88f. In each of the ring bands, the width (spacing between two diffraction steps) in the direction of the minor axis (vertical direction in the figure) is set to be smaller than the width (spacing between two diffraction steps) in the direction of the major axis (horizontal direction in the figure) of the ring band. For example, in FIG. 7(d), a width Ps in the direction of the minor axis is smaller than a width P1 in the direction of the major axis in the ring band 88e. As expressed in (Math. 1), as the pitch of the diffraction steps becomes smaller, the diffraction angle θ becomes larger, and thus, the laser beam in cross section is expanded more greatly in a direction in which the pitch of the diffraction steps is relatively smaller. Therefore, by using the diffraction grating 88 as illustrated in FIG. 7(d), an exiting laser beam becomes more circular than the incident laser beam. In this way, according to this embodiment, by adjusting the ratio of the pitches of the diffraction steps in the major axis direction and in the minor axis direction of the oval in accordance with the shape in cross section of an incident laser beam 86, the shape in cross section of the exiting beam may be shaped to be circular.

Figure 8:
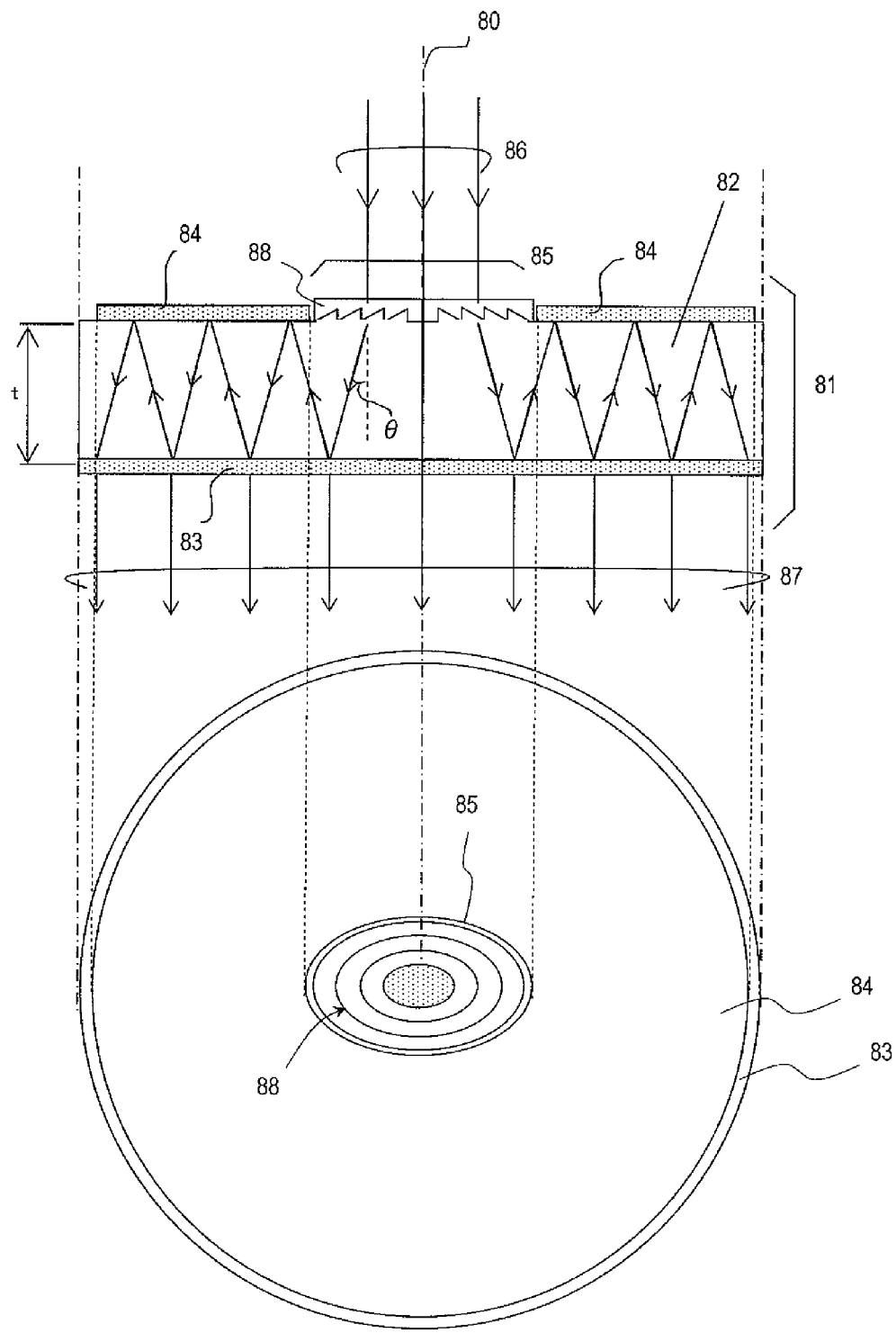
FIG. 8 is a sectional view and a plan view illustrating a device 81 for obtaining incoherent light of a fifth embodiment.

FIG. 8 illustrates a device 81 for obtaining incoherent light of this embodiment. In the device 81 for obtaining incoherent light illustrated in FIG. 8, not only the diffraction grating 88 but also an incident window 85 has an oval flat surface shape with a central axis 80 being the center thereof. However, the incident window 85 may have any flat surface shape insofar as the entire laser beam 86 may enter the incident window 85. The minor axis side of the laser beam 86 is expanded by the diffraction grating 88, and thus, a total reflection mirror 84 and a partially transmissive filter 83 may have circular flat surface shapes with the central axis 80 of the incident laser beam 86 being the center thereof. This embodiment is similar to the second embodiment except for this point, and thus, detailed description thereof is omitted.

In the present invention, the pattern of the diffraction grating is not limited to a concentric pattern or an oval pattern, and, as illustrated in FIG. 7(e), a diffraction grating 70 may be divided into a plurality of subregions and the pitch and the arrangement direction of the diffraction grating in each of the subregions may be changed in accordance with the shape and the intensity distribution of the incident laser beam. The diffraction grating 70 illustrated in FIG. 7(e) includes as the subregions a center portion 70a and a side portion 70b located on both sides of the center portion 70a. Each of the center portion 70a and the side portion 70b has a plurality of diffraction steps 74. The side portion 70b is divided into a first side portion 70b1 and a second side portion 70b2 depending on the direction of the diffraction steps 74. For example, when the incident laser beam is oval in cross section, the laser beam is caused to enter so that the major axis direction of the laser beam is aligned with the direction of the long side of the diffraction grating 70. The laser beam enters so as to be perpendicular to a surface of the diffraction grating 70 on which the diffraction grating is provided. In this case, the laser beam is diffracted to a direction perpendicular to the diffraction steps in the respective regions. Therefore, in the center portion 70a, the laser beam is diffracted in a direction A (in the direction of the short side of the diffraction grating 70). In the first side portion 70b1 and the second side portion 70b2, the laser beam is diffracted in a direction B1 and a direction B2, respectively. The directions B1 and B2 are directions which are slanted from the short side direction and the long side direction, respectively, of the diffraction grating 70.

In this way, by providing in the diffraction grating a plurality of subregions for guiding a laser beam in different directions and adjusting the areas of the respective subregions and the spacing between diffraction steps, the shape of light exiting from the device for obtaining incoherent light may be adjusted.

In the structures illustrated in FIG. 7(d) and FIG. 7(e), a laser beam may be diffracted so that the ratio of the length of the minor axis to the major axis in the laser beam exiting from the device for obtaining incoherent light is larger than the ratio of the length of the minor axis to the major axis in the laser beam entering the diffraction grating. The structures illustrated in FIGS. 7(d) and 7(e) may be applied to any of the first to fourth embodiments.

As described above, this embodiment is very useful which has the function of obtaining an incoherent laser beam and, at the same time, shaping the laser beam.

In the following, effects obtained by the diffraction grating of this embodiment are described in comparison with the conventional device illustrated in FIG. 12.

Figure 12:
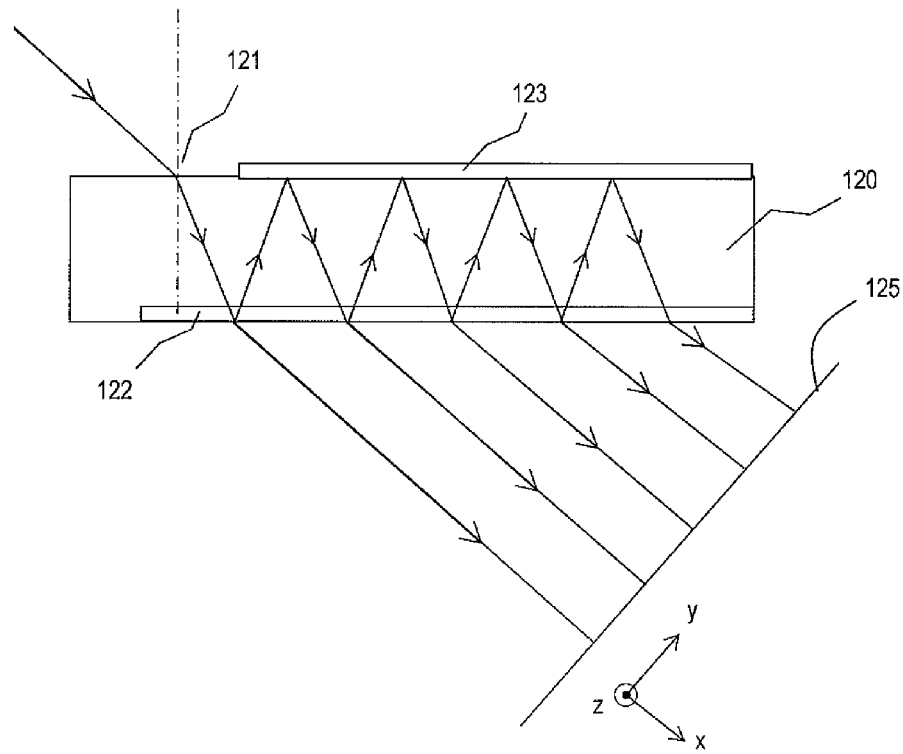
FIG. 12 A sectional view illustrating a conventional optical apparatus disclosed in Patent Document No. 4.
Figure 13:
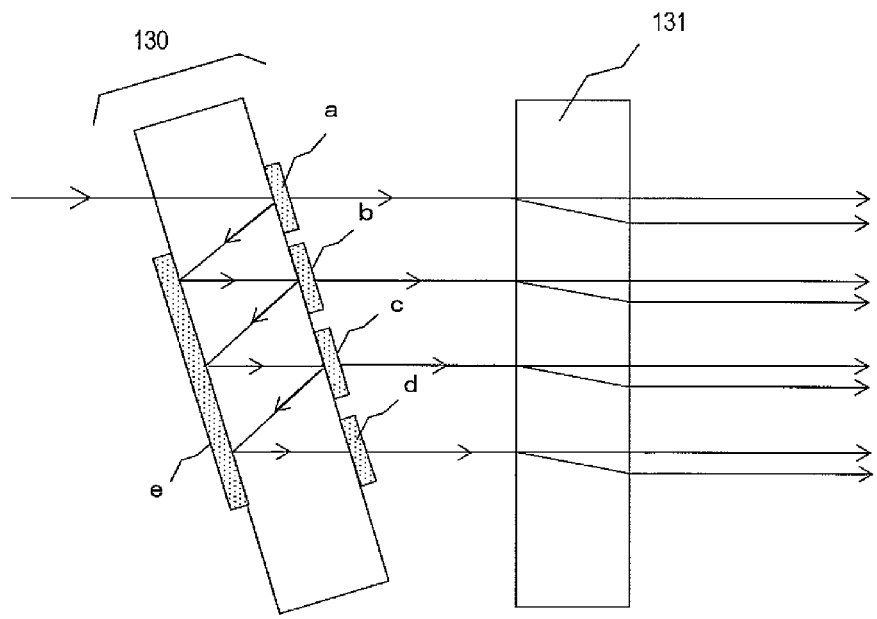
FIG. 13 A sectional view illustrating an optical system of a conventional illumination apparatus disclosed in Patent Document No. 5.

In the conventional device illustrated in FIG. 12, by slanting an incident beam with respect to the normal to an incident plane of the device, the beam is refracted in the device and is emitted toward a surface 125. For the sake of description, suppose the surface 125 is a surface in parallel with a y-z plane. By refracting the light repeatedly in the device, the cross-sectional width in a y direction of the beam formed on the surface 125 is larger than the width in the y direction of the beam entering the device. On the other hand, the cross-sectional width in a z direction of the beam formed on the surface 125 is thought to be substantially the same as the width in the z direction of the beam entering the device. When a beam which is oval in cross section enters the conventional device illustrated in FIG. 12, in order to correct the shape thereof in cross section to be circular, the direction and the angle of slanting the beam with respect to the incident plane are uniquely limited. Therefore, the optical-path length difference may be changed only by changing the thickness t of the device. In this way, in the device illustrated in FIG. 12, it is difficult to change the layout.

On the other hand, in this embodiment, an incident beam entering so as to be in parallel with the normal to an incident plane of the device is diffracted by the diffraction grating, and the exiting beam in cross section is larger than the incident beam in cross section.

When the device for obtaining incoherent light is symmetrical with respect to the central axis of the incident laser beam as in the first to fifth embodiments, by adjusting the pitch of the steps in the diffraction grating as illustrated in FIG. 7(d), the laser beam which is oval in cross section may be corrected so as to be circular in cross section.

Further, as described below, even when the device for obtaining incoherent light is asymmetrical with respect to the central axis of the incident laser beam (sixth embodiment), by using the diffraction grating illustrated in FIG. 7(e), the laser beam in cross section may be corrected. For example, by varying the direction of formation of the diffraction steps for each subregion as illustrated in FIG. 7(e), the direction of diffracting light may be varied for each subregion. When an oval beam as illustrated in FIG. 7(c) enters, for the purpose of expanding the beam more in the minor axis direction, by increasing the ratio of the area of a region having a diffraction grating pattern in which the beam is diffracted in this direction, the exiting beam may be shaped to be circular. Further, by adjusting the pitch of the steps in the diffraction grating, the optical-path length difference in the beam may be arbitrarily controlled. In this way, the diffraction grating of this embodiment has an advantage that the degree of flexibility in layout is high. The diffraction grating according to this embodiment may control the shape of the beam and the coherence without changing the device size.

(Sixth Embodiment)

Figure 9A:
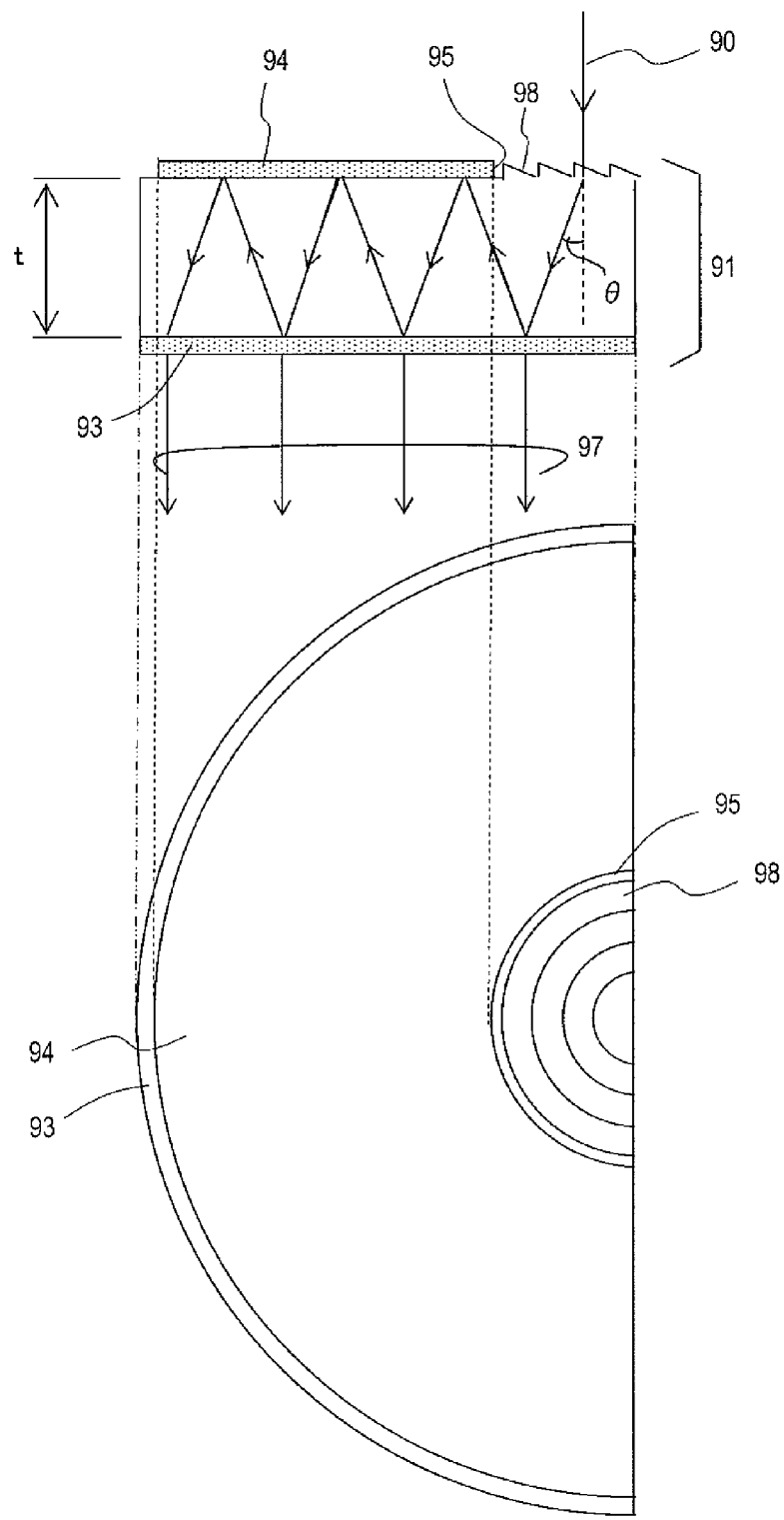
FIG. 9A is a sectional view and a plan view illustrating a device 91 for obtaining incoherent light of a sixth embodiment.
Figure 9B:
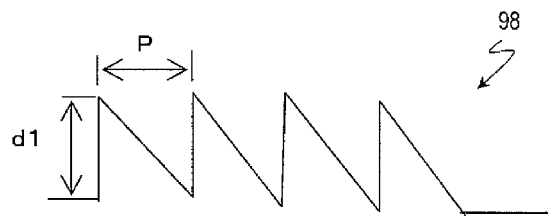
FIG. 9B is an enlarged sectional view of an incident window 95 in the sixth embodiment.

FIG. 9A is a sectional view illustrating a device for obtaining incoherent light according to a sixth embodiment of the present invention. A device 91 for obtaining incoherent light of this embodiment has a semicircular flat surface shape. A diffraction grating 98, a total reflection mirror 94, and a partially transmissive filter 93 have semicircular flat surface shapes which are concentric. Other structures are similar to those in the first embodiment, and thus, detailed description thereof is omitted. As illustrated in FIG. 9B, the diffraction grating 98 has a plurality of diffraction steps. Each step has a height d1 and a step-to-step pitch P. In this embodiment, not only a part of the device for obtaining incoherent light of the first embodiment but also a part of the device for obtaining incoherent light of any one of the second to fifth embodiments may be used.

The device 9 for obtaining incoherent light of this embodiment has a semicircular flat surface shape, but the device may have other shapes (for example, a linear shape).

Figure 10:
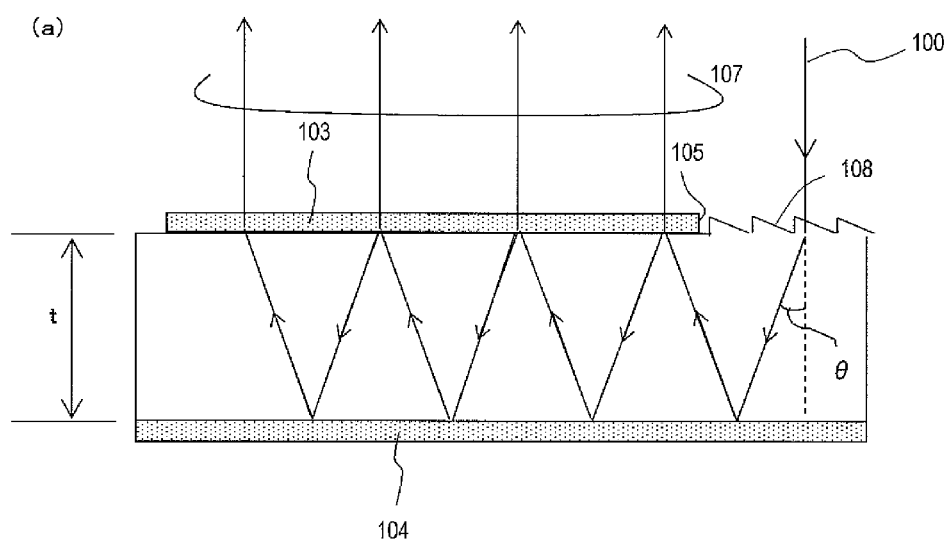
FIG. 10(a) is a sectional view and a plan view illustrating a device for obtaining incoherent light of a modified example of the sixth embodiment.
FIG. 10(b) is an enlarged sectional view of an incident window 105 in the modified example of the sixth embodiment.
Figure 10:
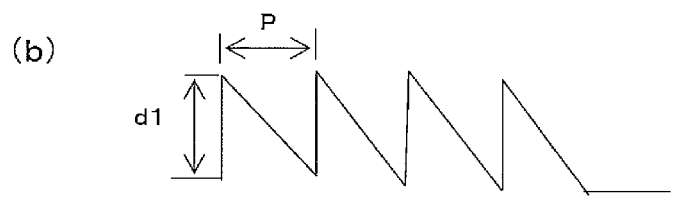

FIG. 10(a) is a sectional view illustrating a modified example of the sixth embodiment. FIG. 10(b) is an enlarged view of a diffraction grating 108 illustrated in FIG. 10(a). An incoherent device 101 of this modified example has a structure in which the location of the total reflection mirror 94 and the location of the partially transmissive filter 93 of the device 91 for obtaining incoherent light described above are exchanged. More specifically, a partially transmissive filter 103 is provided on the side on which a laser beam 100 enters in a device 101 for obtaining incoherent light. An incident window 105 is provided in the partially transmissive filter 103 and the diffraction grating 108 is located in the incident window 105. The laser beam 100 entering the incident window 105 is diffracted by the diffraction grating 108 to be a diffracted beam, and reaches a total reflection mirror 104. The diffracted beam is repeatedly reflected alternately by the partially transmissive filter 103 and the total reflection mirror 104, and a part of the diffracted beam is emitted from the partially transmissive filter 103. In this embodiment, a diverging beam 107 is emitted from a surface on the side on which the laser beam 100 has entered. However, the diverging beam 107 is diffracted and reflected, and thus, strictly speaking, it is often the case that the direction in which the diverging beam 107 is emitted is different from the direction in which the laser beam 100 has entered. Note that, also in the first to fifth embodiments, the diverging beam may be emitted from a surface on the side on which the laser beam has entered as in this modified example.

As described above, according to this embodiment, by using the diffraction grating, even a small device may have high light use efficiency and may control with ease the light intensity distribution of an exiting beam.

(Seventh Embodiment)

Figure 11:
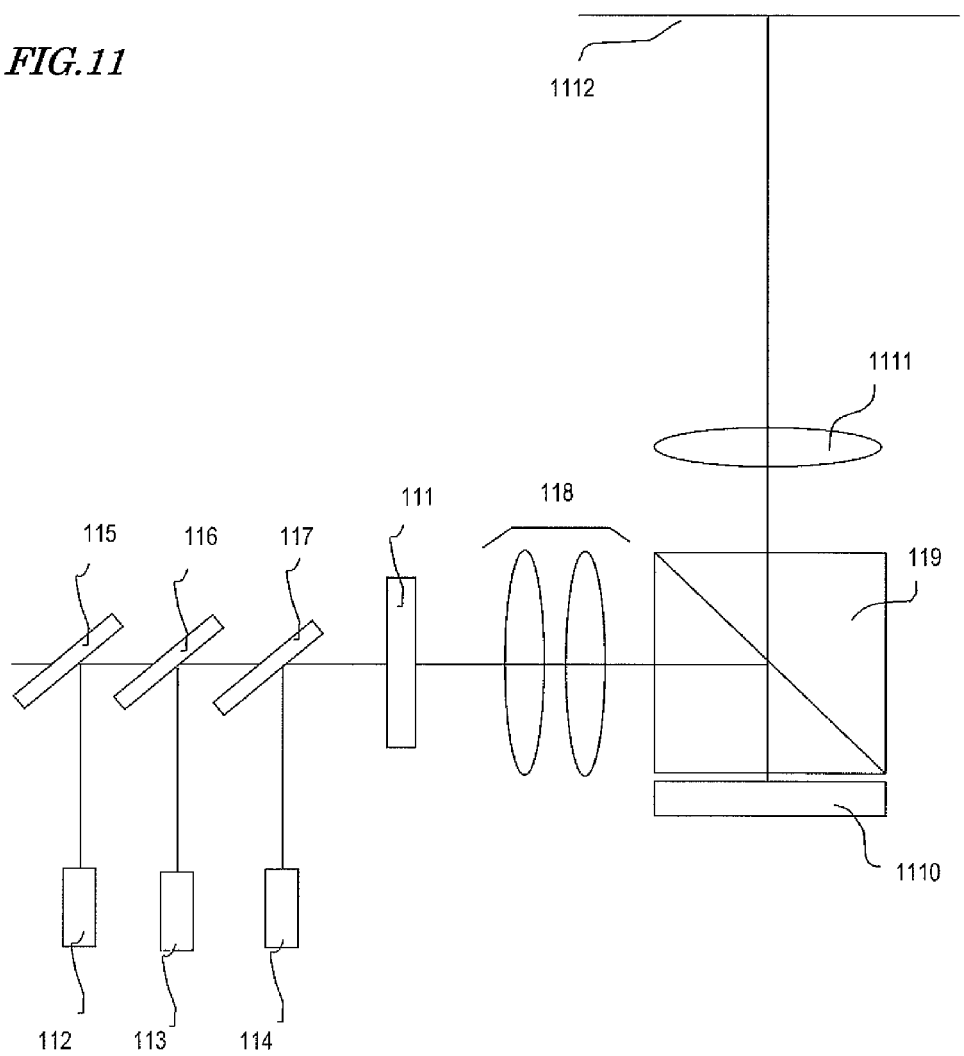
FIG. 11 is a schematic structural view illustrating an optical apparatus according to an embodiment of the present invention.

FIG. 11 is a schematic structural view illustrating an optical apparatus according to an embodiment of the present invention. The optical apparatus of this embodiment is an optical apparatus for projecting an image on a screen, and includes a device 111 for obtaining incoherent light of the first to sixth embodiments in its optical system. Operation of this optical apparatus is described in the following.

Blue wavelength laser light exiting from a blue wavelength laser light source 112 is reflected by a mirror 115. Red wavelength laser light and green wavelength laser light exiting from a red wavelength laser light source 113 and a green wavelength laser light source are wavelength-selectively reflected by color separation filters 116 and 117, respectively. The laser light beams are synthesized on the same optical axis to enter the device 111 for obtaining incoherent light. A beam output from the device 111 for obtaining incoherent light enters a lens optical system 118. Uniformization of the beam intensity and adjustment of the beam size are carried out in the lens optical system 118. After that, the beam reaches a polarization beam splitter 119. The polarization beam splitter 119 is an optical element which reflects almost 100% of S-polarized light (polarized light perpendicular to the drawing sheet) and passes through almost 100% of P-polarized light (polarized light within the drawing sheet) in the entire visible wavelength region. An S-polarized laser beam is emitted from the blue wavelength laser light source 112, the red wavelength laser light source 113, and the green wavelength laser light source 114, and the S-polarized light is maintained also in the device 111 for obtaining incoherent light. Light reflected by the polarization beam splitter reaches a spatial light modulator 1110. This includes a reflective liquid crystal panel, and gives image information of R, G, and B to the blue wavelength laser beam, the red wavelength laser beam, and the green wavelength laser beam, respectively. The light beams modulated by the spatial light modulator 1110 are simultaneously converted from S-polarized light to P-polarized light, and again reach the polarization beam splitter 119, and, after passing therethrough, project an image on a screen 1112 by a projection lens optical system 1111.

As the device 111 for obtaining incoherent light, one illustrated in FIG. 1A was used. The step height d1 in the diffraction grating was 1.76 μm, the pitch P in the diffraction grating was 8 μm, and the order of diffraction was the second order. Further, by setting the optical-path difference between adjacent light beams to be several hundred micrometers which was larger than the wavelength of light exiting from the respective laser light sources, the exiting laser beam could be made incoherent.

First, under a state in which the device 111 for obtaining incoherent light was not included in the optical system, another lens optical system was included and the size of a beam which entered the polarization beam splitter 119 was optimized, and then, the spatial light modulator 1110 was actuated to display an image on the screen 1112. As speckle noise, brightness fluctuations of about 35% at the maximum were observed. The speckle noise was at a level which became a problem even in visual observation.

Then, as illustrated in FIG. 11, the device 111 for obtaining incoherent light was inserted, and the spatial light modulator 1110 was again actuated to display an image on the screen 1112. The speckle noise was inhibited so that the brightness fluctuations were about 5% at the maximum, and the speckle noise was reduced to a level which presented almost no problem in visual observation.

Note that, by enhancing the monochromaticity of the laser light sources, that is, the peak line width with respect to the wavelengths, the coherence length becomes smaller and the speckle noise may be reduced. For the purpose of miniaturizing the optical system, the specifications of the device for obtaining incoherent light may be determined in accordance with the wavelength widths of the laser light sources.

The optical apparatus according to the present invention uses a laser as a light source, and thus, compared with a case in which an LED light source is used, an image having a luminous intensity which is several times as high may be obtained, and speckle noise may be reduced without using a special mechanical or electrical actuating element.

In this embodiment, the device for obtaining incoherent light of the first embodiment was used. When other devices for obtaining incoherent light of the second embodiment and the like are used, each of which has high light efficiency in the entire visible wavelength region, an optical apparatus which displays a brighter and more vivid image is feasible.

An optical apparatus for projecting an image on a screen is described above, but the device for obtaining incoherent light according to the embodiments has not only the effect of reducing speckle noise but also the effect of lowering the intensity of the laser beam at a light gathering spot of the laser by reducing the coherence of the laser beam. The device for obtaining incoherent light of the embodiments may also be applied to a head mount display in which lasers of R, G, and B wavelengths scan on human retina to display an image on the retina. In this case, the characteristics of the device for obtaining incoherent light of the embodiments that the device is small and does not have a mechanical or electrical actuating element may be effectively used, and a compact optical apparatus may be realized.

In the first to sixth embodiments described above, the transparent substrate is not necessarily required to be provided. In this case, for example, a diffractive lens is provided in the incident window and air may intervene between the partially transmissive filter and the total reflection mirror. However, a member for fixing the positional relationship between the partially transmissive filter and the total reflection mirror is necessary.

INDUSTRIAL APPLICABILITY

The device for obtaining incoherent light according to the present invention may be used for projecting or displaying a bright image or video, and, in particular, may be used for a portable projector or a display.

REFERENCE SIGNS LIST 10, 20, 50, 60, 80 central axis
11, 21, 51, 61, 81, 91, 101 device for obtaining incoherent light
12, 22, 52, 62, 82, 92, 102 transparent base material
13, 23, 53, 63, 611, 83, 93, 103 partially transmissive filter
14, 24, 54, 64, 84, 94, 104 total reflection mirror
15, 25, 55, 65, 85, 95, 105 incident window
16, 26, 56, 66, 86, 90, 100 incident laser beam
17, 27, 57, 67, 87, 97, 107 exiting beam
18a, 28a, 68, 88, 98, 108 blazed diffraction step portion
18b, 28b, 78b, 708b flat portion
29, 59, 69 protective film
58 binary diffraction grating
610 reflective diffraction portion
78a concentric diffraction grating
708a oval diffraction grating
112 blue wavelength laser light source
113 red wavelength laser light source
114 green wavelength laser light source
115 mirror
116, 117 color separation filter 118 lens optical system
119 polarization beam splitter
1110 spatial light modulator
1111 projection lens optical system
1112 screen
120 plane parallel plate
122, 123 reflection surface
130 beam splitter
131 birefringent crystal

The invention claimed is:

1. An optical member, comprising:
a total reflection mirror including a reflection surface for reflecting a laser beam;
a filter including a partially transmissive surface for passing therethrough a part of the laser beam and reflecting a remaining part of the laser beam, the partially transmissive surface being located so as to be opposed to the reflection surface; and
a diffraction grating into which the laser beam enters, for diffracting the incident laser beam to enter the total reflection mirror or the partially transmissive filter,
wherein:
the total reflection mirror has an opening for causing the laser beam to enter the diffraction grating;
the laser beam enters the opening so as to be perpendicular to the opening;
a cross section of the laser beam has a major axis and a minor axis; and
the diffraction grating diffracts the laser beam so that a ratio of a length of the minor axis to the major axis in the laser beam exiting from the optical member is larger than a ratio of the length of the minor axis to the major axis in the laser beam entering the diffraction grating.

2. The optical member of claim 1, further comprising a transparent member provided between the total reflection mirror and the partially transmissive filter,
wherein the diffraction grating is provided on a surface of the transparent member.

3. The optical member of claim 1, further comprising a protective film for covering a surface of the diffraction grating.

4. The optical member of claim 3, wherein any one of a material of the diffraction grating and a material of the protective film has a refractive index higher than a refractive index of another one of the materials and has an Abbe number larger than an Abbe number of the another one of the materials.

5. The optical member of claim 3, wherein the diffraction grating and the protective film include a resin, and the resin included in at least any one of the diffraction grating and the protective film has inorganic particles dispersed therein.

6. The optical member of claim 3, wherein the protective film comprises a material in which particles of at least any one of zirconium oxide, yttrium oxide, and aluminum oxide are dispersed in a photo-curable resin.

7. The optical member of claim 1, wherein the cross section of the laser beam exiting from the optical member has a shape which is isotropic with respect to the center of the cross section.

8. The optical member of claim 1, wherein the diffraction grating comprises a plurality of subregions for diffracting the laser beam in different directions.

9. The optical member of claim 1, wherein:
the diffraction grating includes a plurality of diffraction steps;
the plurality of diffraction steps have oval flat surface shapes which are concentric; and
spacing between adjacent two of the plurality of diffraction steps is smaller in a minor axis direction of the oval than in a major axis direction of the oval.

10. The optical member of claim 1, wherein:
when the laser beam diffracted by the diffraction grating enters the total reflection mirror, the laser beam is reflected by the total reflection mirror to enter the partially transmissive filter; and
when the laser beam diffracted by the diffraction grating enters the partially transmissive filter, a part of the laser beam passes through the partially transmissive filter and the remaining part of the laser beam is reflected by the partially transmissive filter to enter the total reflection mirror.

11. The optical member of claim 1, wherein the cross section of the laser beam exiting from the optical member is larger than the cross section of the laser beam entering the optical member.

12. An optical apparatus, comprising:
a laser light source;
a spatial light modulation element for modulating a laser beam exiting from the laser light source;
a projection optical system for projecting light modulated by the spatial light modulation element as an image; and
the optical member of claim 1, the optical member being located between the laser light source and the spatial light modulation element.

13. The optical apparatus of claim 12, wherein the laser light source comprises a red wavelength laser light source, a green wavelength laser light source, and a blue wavelength laser light source.

* * * * *